Feb. 26, 1935.  J. WARTMAN  1,992,406
CLUTCH FOR CHECKROW CABLES
Filed Dec. 26, 1931
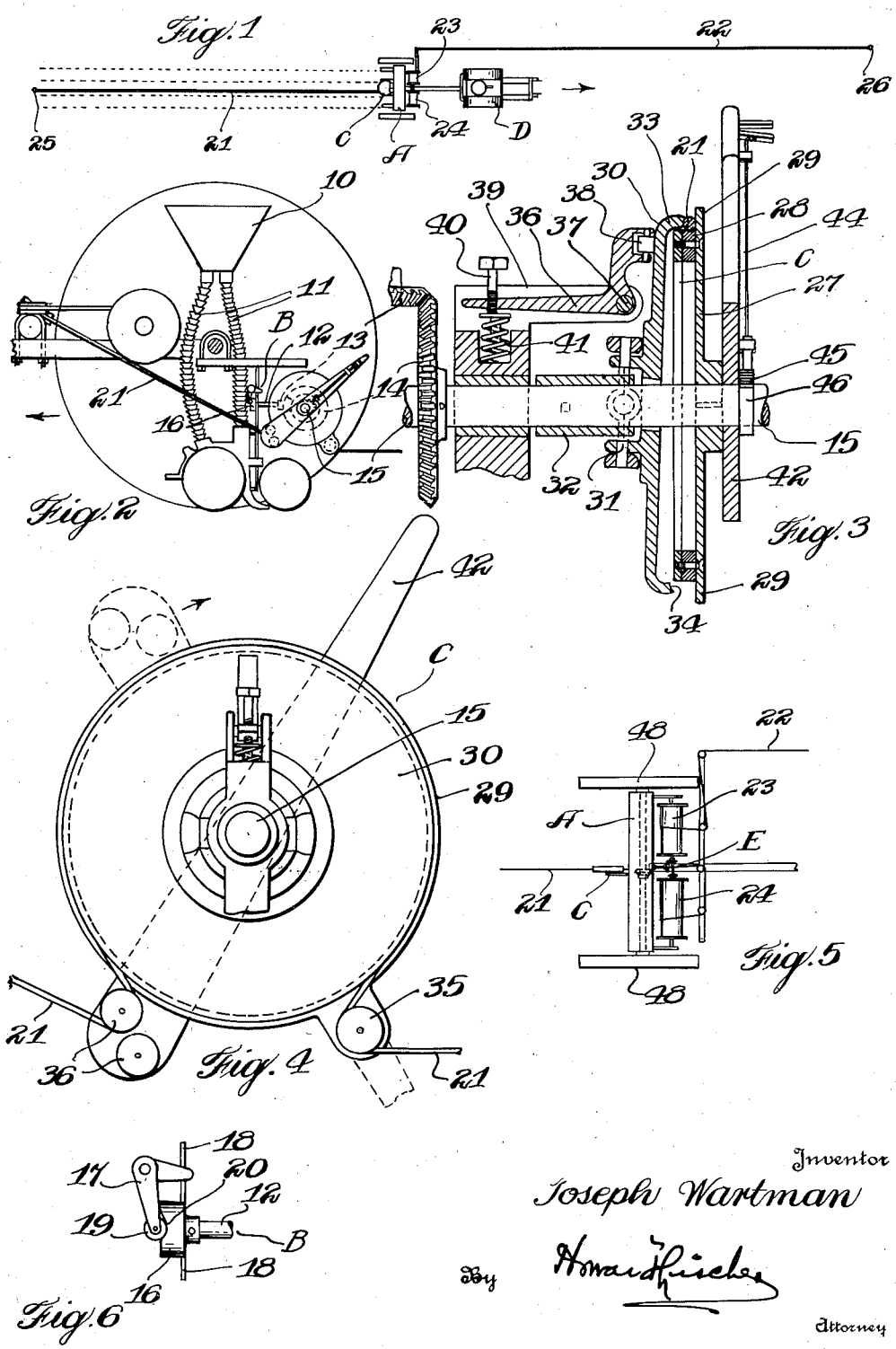
Inventor
Joseph Wartman
By Howard Fischer
Attorney Patented Feb. 26, 1935

1,992,406

UNITED STATES PATENT OFFICE 1,992,406

CLUTCH FOR CHECKROW CABLES

Joseph Wartman, Shakopee, Minn.

Application December 26, 1931, Serial No. 583,236

8 Claims. (Cl. 111—43)

My invention relates to a clutch for checkrow cables for seeders and includes a means of engaging a cable used to operate the checking mechanism of the seeder so that at spaced intervals the seed will be dropped to the ground to permit the farmer to accurately seed the field so that it can be cultivated accordingly thereafter.

Heretofore many devices have been made for operating the checking mechanism and usually these devices have been more or less inefficient in operating to accomplish the desired result. These former devices have also been of a more complicated nature and difficult to handle in the field. These features I have overcome with my simple, inexpensive and practically operated clutch for checkrow cable.

A feature resides in a clutch mounted upon the seeder in a convenient manner so that the cable which is extended from a suitable anchor may pass through the clutch and automatically operate the same in the movement of the seeder so that at spaced intervals or predetermined points seed is dropped to the ground so as to more accurately operate the seeder to make the rows conform with each other as well as the cross rows.

It is also a feature to provide means for handling the cables which are anchored at the outer ends in the field and the inner ends on a pair of cable drums, one of which is adapted to operate to release the cable, while the other winds up the cable which is anchored at the other end of the field. By using two cables it is easier to operate the seeder, however, it is not necessary that two cables be used in the operation of my clutch for the checkrow cable. The novel structure of the clutch with its simplicity of operation to control the checking mechanism on the seeder is of primary importance.

The clutching means for the cable is so constructed as to engage the checkrow cable which does not have any nuts, knobs, or other shoulder means along the cable, but is of a natural cable character, made up of one or more wires having a comparatively smooth outer surface and my clutch is adapted to be operated by the same so as to operate the checking mechanism on the seeder at the desired intervals to drop the seed to the ground. The construction of the clutch is such as to engage the cable firmly without slipping and thereby accurately operate the checking mechanism at the proper intervals. The gripping means of the clutch is self-adjusting to maintain the proper gripping engagement with the cable at all times, and a suitable cable release means is provided for the clutch so that the cable may be disengaged from the clutch when it is desired.

These features together with other details will be more fully and clearly set forth in the following specification and claims.

In the drawing forming part of this specification:

Figure 1 is a diagrammatic plan view of a tractor pulling a seeder across a field, using my clutch for the checkrow cables.

Figure 2 is a diagrammatic side elevation of a portion of the seeder and checking mechanism, showing my clutch in operation therewith.

Figure 3 is a diagrammatic sectional view through my clutch in an enlarged form adapted to illustrate the detail thereof.

Figure 4 is a side view of my clutch, showing the relation in which the checkrow cable extends about the same.

Figure 5 is a diagrammatic plan view of a portion of the seeder, showing the cable drums and my clutch for the checkrow cable.

Figure 6 is a detail of a portion of the device.

The seeder A may be of any suitable well known construction wherein a seed hopper 10 is provided from which the seed and fertilizer, if desired, may be checked through the flexible tubes 11, so as to drop the same to the ground at intervals, the fertilizer being dropped simultaneously with the seed, if it is desired, or the seed alone being dropped to the ground in planting.

The seeder A is provided with a suitable checking mechanism B which is operated by the shaft 12 through the beveled gears 13 and 14 from the shaft 15. The checking mechanism includes an operating cam 16 on the upper end of the shaft 12 which is adapted to operate the bell crank lever 17 in a manner so as to operate the checking rod 18 each time the shaft 12 is rotated so that the antifriction wheel 19 carried by one end of the bell crank lever 17 drops into the recess 20 in the operating cam 16.

The shaft 15 is mounted in a suitable manner in the frame of the seeder A and is adapted to be rotated by means of the clutch C when engaging the cable 21 or 22. Figure 1 illustrates a tractor D moving in the direction of the arrow winding up the cable 22 on the drum 23, while the cable 21 is being unwound from the drum 24. As the cable 21 passes from the drum 24 it extends to and around a portion of the clutch C as illustrated in Figure 4 and is adapted to rotate the clutch as will be hereinafter set forth. The ends of the cables 21 and 22 are anchored at 25 and 26, respectively, at the ends of the field which is being planted by the seeder A.

The clutch C is formed with an operating disc 27 which is keyed to the shaft 15 so that when the disc 27 rotates the shaft 15 will be driven in the direction of rotation of the disc. This disc is provided with a cable friction ring 28 spaced a short distance from the periphery of the disc 27 which may be made of rubber fibre or any other suitable material and against which the checkrow cable 21 or 22 is adapted to engage. An annular flange 29 is formed by the outer or peripheral end of the disc 27 which projects beyond the gripping ring 28 and forms a shoulder against which the cable 21 can ride as it extends around the ring 28.

I provide a self-adjusting and automatically operated cable guide 30 which is mounted with a universal joint 31 on the sleeve 32. The sleeve 32 is secured to the shaft 15 so as to rotate therewith. The cable guide 30 is of a disc-like nature and is formed with an inturned annular flange 33 having a cable groove 34 in the inner edge of the same which is adapted to engage against the side of the cable 21 and keep the same against the annular shoulder flange 29, the cable 21 engaging with the most force against the driving ring 28.

The cable guide 30 is held in operative position with the upper portion leaning toward the flange 29, while the lower portion extends away from the flange 29, thus permitting the cable 21 or 22 to be freely guided into gripping position in the clutch C with the cable 21 gripping firmly against the driving ring 28. This ring is of a consistency or nature to prevent slipping of the cable 21 and in view of the extending of the cable 21 around a portion greater than the semi-circumference of the clutch 28 by reason of the guide roller 35 and the pair of adjustable guide rollers 36, it is practically impossible for any slipping to take place between the clutch C and the cable 21. Thus a positive driving of the shaft 15 is accomplished by the movement of the cable 21 through the clutch C.

The means for holding the guide 30 in operative position includes a bell crank lever 36 pivoted at 37 and having an anti-friction engagement 38 with the outer surface of the guide disc 30. This lever 36 is held by the bracket 39 and the outer end of the same is supported by the adjusting screw 40 in a manner to bear against the spring 41 which automatically pushes the anti-friction roller 38 against the disc 30 to hold the guide 30 in engagement with the cable 21 at and near the top of the clutch C. By adjusting the screw 40 the tension of the spring 41 may be regulated to increase or decrease the pressure of the anti-friction roller 38 against the cable guiding disc 30. The universal joint 31 permits the cable guide disc 30 to move freely into operative position to hold the cable 21 in operative position against the shoulder 29 and gripping onto the driving ring 28. Thus the clutch C operates to hold the cable 21 in a manner to drive the clutch which in turn drives the shaft 15.

When it is desired to remove the cable 21 from the clutch C, the lever 42 which is pivoted on the shaft 15 and which carries the anti-friction rolls 36, is rotated in the direction of the arrows, illustrated in Figure 4, and into the dotted line position to carry the cable 21 up to a position to release the same from the clutch C. The cable may then be slipped out between the rollers 36 and disengaged entirely from the clutch C.

The lever 42 may be held by a suitable catch 44 which may engage in the notches 45 of the member 46, held stationary in any suitable manner, so that the lever 42 may be set to hold the cable 21 wrapped around the gripping ring 28 of the clutch C. When it is desired to release the cable, the catch may be operated to release the cable 42 and the lever moved in the dotted line position, as illustrated in Figure 4.

The drums 23 and 24 are adapted to be operated by the driving and clutch means E which may be operated by the axle or shaft driven by the wheels 48 of the seeder A. The clutch and driving mechanism E is only diagrammatically shown and is adapted to be shiftable in a manner to drive either the drum 23 or the drum 24. When the drum 23 is winding up the cable 22 then the clutch and driving means E will be operated to rotate the drum 23 to wind up the cable 22. Whereas, the drum 24 will rotate freely to permit the cable 21 to unwind out through the clutch C. The operation is just the opposite when the drum 24 is rotating to wind up the cable 21 because then the cable 22 would be unwinding from the free drum 23.

The shaft 15 is adapted to drive the bevel gear 14 which in turn drives the gear 13 and thus rotates the shaft 12 to operate the checking mechanism of the seeder A.

In the operation of the seeder A when drawn by the tractor D, as illustrated in Figure 1, the cable 22 will wind up onto the drum 23, while the cable 21 will be unwound from the drum 24, passing through the clutch C, the outer end being anchored at 25. As the cable unwinds from the drum 24 the clutch C is rotated, driving the shaft 15 and in turn through the gears 13 and 14 driving the shaft 12 and operating the checking mechanism B to drop the seed or seed and fertilizer from the hopper 10 in an accurate manner at predetermined points so as to accurately seed the field as the seeder passes over the same. The clutch C is of a very simple nature and is designed to effectively engage the cable which is wrapped around a considerable surface of the driving ring 28 so that the operation of the clutch is positive by the cable. In this manner a comparatively smooth cable 21 or 22 can be used and the checker mechanism B of the seeder A is accurately operated.

In accordance with the patent statutes I have described the principles of my clutch and checkrow cable, and while I have illustrated a particular formation and design thereof, as well as a particular use for this clutch, I desire to have it understood that the same may be applied to other uses and carried out by other means than those herein set forth within the scope of the following claims without departing from the spirit of this invention.

I claim:

1. A clutch for checkrow cables including, a disc-like member a shaft secured to the disc-like member, a cable engaging ring connected to said disc, means for holding the cable partially wrapped around said ring, tiltable means for engaging a portion of said wrapped cable, and means operable by said shaft in the rotation of said disc driven by a checkrow cable to operate a seed checking mechanism on a seeder at spaced intervals.

2. A clutch for checkrow cables including, a shaft, a disc supported on said shaft and adapted to drive the same, a cable engaging ring carried by said disc, a circular guide tiltable to guide a portion of the cable extending around said ring, means for adjusting the amount of the ring engaged by the cable means for adjusting said guide, and means driven by said shaft for operating a checking mechanism of a seeder.

3. A clutch for a checkrow cable including, means for engaging a comparatively smooth checkrow cable with a clamping action, means operated by said clutch for operating the checking mechanism of a seeder, movable guide means, and means for moving said guide means for releasing the cable from said clutch.

4. A checkrow cable clutch including, a disc-like member, a cable gripping ring supported by said disc, a tiltable guide for holding the cable on said ring, resilient adjustable means for holding said guide into operative position, means for adjusting the proportion of the ring engaged by the cable, a shaft adapted to be driven by said clutch, and means connecting said shaft with the checking mechanism of a seeder whereby the rotation of said shaft operated by said clutch in the engagement of a checkrow cable is adapted to operate a checking mechanism to drop seed at spaced intervals.

5. A checkrow cable clutch including, means for clamping a checkrow cable to rotate said clutch by the engagement of the cable, means for releasing the cable from engagement with said clutch, spring means for adjusting the tension of said clutch on said cable, and means operated by the rotation of said clutch as the checkrow cable passes therethrough to cause the checking mechanism of a seeder to be operated at spaced intervals.

6. A checkrow cable clutch including, a disc, a shaft for supporting and adapted to be rotated by said disc, a cable engaging ring supported by said disc about which the checkrow cable is adapted to be partially wrapped, means for regulating the amount of wrap of the cable, a disc-like cable guide, means for supporting said guide with a universal joint to permit the same to be tilted toward said disc in a manner to hold the checkrow cable in operative position on said disc, resilient adjustable means for holding said guide in operative position, and means connecting said shaft with the checking mechanism of a seeder whereby when the checkrow cable is engaged in said clutch the checking mechanism will be positively operated as the checkrow cable passes through said clutch.

7. A checkrow cable clutch for seeders and the like including, a disc member, a shaft for supporting and adapted to be driven by said member, a checkrow cable engaging ring carried by said disc, an automatically adjustable guide for the cable to hold the same in operative position on said ring, means for adjusting said guide, means driven by said shaft to operate the checking mechanism of a seeder, lever and guide means for holding the checkrow cable wrapped partially around said cable ring, and means for releasing the lever and guide means to force the checkrow cable out of said clutch.

8. A cable clutch including, a disc-like member, a cable engaging ring formed of gripping material, a tiltable disc cable guide adapted to hold a cable in position on said ring to drive said clutch by the cable, means for resiliently and adjustably holding said tiltable guide in operative position with one side of said guide against the cable in the clutch and the other side extending away from said ring and cable, and adjustable guide means for holding a variable amount of a cable partially wrapped around said ring.

JOSEPH WARTMAN.